(12) United States Patent
Ohnuki

(10) Patent No.: US 6,440,025 B1
(45) Date of Patent: Aug. 27, 2002

(54) BELT FOR CONTINUOUSLY VARIABLE TRANSMISSION

(75) Inventor: Motonori Ohnuki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/646,891

(22) PCT Filed: Sep. 8, 1999

(86) PCT No.: PCT/JP99/01109
§ 371 (c)(1),
(2), (4) Date: Oct. 6, 2000

(87) PCT Pub. No.: WO99/53218
PCT Pub. Date: Oct. 21, 1999

(30) Foreign Application Priority Data

Apr. 10, 1998 (JP) .............................. 10-98665
Feb. 12, 1999 (JP) .............................. 11-34802

(51) Int. Cl.$^7$ ................................. F16H 5/16
(52) U.S. Cl. ..................................... 474/242
(58) Field of Search ................. 474/201, 240, 474/242, 245

(56) References Cited

U.S. PATENT DOCUMENTS 4,655,732 A * 4/1987 Takashima ............... 474/201
4,894,049 A * 1/1990 Koppelaars ............... 474/240
5,154,675 A * 10/1992 Roovers ................... 474/242

FOREIGN PATENT DOCUMENTS

| JP | 61-96036 | 6/1986 |
|---|---|---|
| JP | 62-191945 | 12/1987 |
| JP | 63-33046 | 3/1988 |
| JP | 4-362338 | 12/1992 |

* cited by examiner

Primary Examiner—David A. Bucci
Assistant Examiner—Timothy McAnulty
(74) Attorney, Agent, or Firm—Arent Fox Kintner Plotkin & Kahn, PLLC

(57) ABSTRACT

Each of metal elements 32 includes an element body portion 34 and an element head portion 36 on radially inner and outer sides of left and right ring slots 35 into which metal ring assemblies 31 are fitted, respectively. The metal elements 32 can be brought into contact with one another at inner contact surfaces 38 and outer contact surfaces 39 each of which are formed on the element body portion 34 and the element head portion 36, respectively. The width $W_2$ of each of the outer contact surfaces 39 which is in contact with each other when the metal elements 32 are in a chord portion of the metal belt, is set at a large value so as to prevent the yawing of the metal elements 32, and the width $W_1$ of each of the inner contact surfaces 38 which is in contact with each other when the metal elements 32 are in a pulley-wound zone, is set at a small value so as to permit the yawing of the metal elements 32, whereby the absorption of a misalignment between a drive pulley 6 and a driven pulley 11 and the prevention of the zigzag movement of a metal belt 15 can be reconciled.

4 Claims, 11 Drawing Sheets

BELT FOR CONTINUOUSLY VARIABLE TRANSMISSION

FIELD OF THE INVENTION

The present invention relates to a belt for a continuously variable transmission, including a large number of metal elements supported on metal ring assemblies each of which is comprised of a plurality of endless metal rings laminated one on another, and particularly, to a metal element structure thereof.

BACKGROUND ART

As shown in FIG. 14, in a belt-type continuously variable transmission including a metal belt 03 wound around a drive pulley 01 and a driven pulley 02, a stationary pulley half 04 of the drive pulley 01 and a stationary pulley half 05 of the driven pulley 02 are disposed at diagonal positions, and a movable pulley half 06 of the drive pulley 01 and a movable pulley half 07 of the driven pulley 02 are disposed at diagonal positions. Therefore, when the movable pulley halves 06 and 07 of the drive pulley 01 and the driven pulley 02 are moved toward or away from the stationary pulley halves 04 and 05, the center line La of a V-groove in the drive pulley 01 and the center line Lb of a V-groove in the driven pulley 02 are not aligned with each other to produce a small misalignment α (which is usually of 1 mm or less).

A belt-type continuously variable transmission is conventionally known from Japanese Patent Application Laid-open No. 4-362338, in which to wind the metal belt 03 around the drive pulley 01 and the driven pulley 02 with the misalignment a absorbed, at least one of the front and rear contact surfaces of the metal elements 08 constituting the metal belt 03 is formed into an arcuate shape, thereby making a relative yawing possible between the metal elements 08 which are in contact with each other.

Further, a belt-type continuously variable transmission is disclosed in Japanese Utility Model Application Laid-open No. 63-33046, in which the thickness of a metal element from its outer periphery to an outer periphery side of the pitch line is large, so that the metal element has a wedge-shaped section.

It should be noted here that the metal belt 03 of the belt-type continuously variable transmission described in Japanese Patent Application Laid-open No. 4-362338 is formed to transmit a driving force by a compressing force applied between the metal elements 08 which are in contact with each other at contact surfaces thereof. In a conventional metal belt including metal elements 08 of which contact surfaces are formed into an arcuate shape, however, the attitude of the metal elements 08 in a yawing direction is unstable and for this reason, there is a possibility that the movement of the metal belt 03 in a zigzag direction may be promoted, whereby the efficient transmission of a power may be impeded.

Further, in the belt-type continuously variable transmission disclosed in Japanese Utility Model Application Laid-open No. 63-33046, there are such problems that the formation of the wedge-shaped section of the metal element is difficult, and that the movement of the metal element is unstable, because the pitch lines are separated in a chord portion of a metal belt.

DISCLOSURE OF THE INVENTION

The present invention has been accomplished with the above circumstances in view, and it is an object of the present invention to ensure that the absorption of a misalignment between the drive pulley and the driven pulley and the prevention of the zigzag movement of the metal belt are reconciled in the metal belt for the belt-type continuously variable transmission.

To achieve the above object, according to the present invention, there is provided a belt for a continuously variable transmission, comprising a large number of metal elements supported on metal ring assemblies each of which is comprised of a plurality of endless metal rings laminated one on another, the belt being wound around a drive pulley and a driven pulley to transmit a driving force between both of the pulleys, characterized in that each of the metal elements includes a ring slot into which the metal ring assembly is fitted, an element body portion located on a radially inner side of the ring slot, and an element head portion located on a radially outer side of the ring slot, the element body portion and the element head portion being formed with contact surfaces, respectively, at which adjacent ones of the metal elements can contact with each other, a lateral width of the contact surface of the element body portion being smaller than a lateral width of the contact surface of the element head portion.

With the above arrangement, in a chord portion of the metal belt extending from the drive pulley to the driven pulley, the adjacent metal elements are brought into contact with each other at least on contact surfaces of the element head portions located on the radially outer side to transmit the driving force. At this time, the adjacent metal elements can be brought into close contact with each other without yawing by virtue of the contact surfaces of the element head portions having the large lateral width to reliably transmit the driving force. The misalignment between the drive pulley and the driven pulley can be absorbed by the lateral sliding movement of the contact surfaces of the element head portions on each other. Moreover, in a pulley-wound zone in which the metal elements are wound around the drive pulley and the driven pulley, the adjacent metal elements are in contact with each other on the contact surfaces of the element body portions located on the radially inner side, but at this time, the relative yawing movement between the adjacent metal elements is permitted by virtue of the contact surfaces of the element body portions having the small lateral width. Thus, the inclination of the metal elements in the yawing direction can be corrected, and the metal elements can be wound in a correct attitude around the drive pulley and the driven pulley, thereby avoiding the generation of abnormal wearing of the pulleys and the metal elements.

Further, in the chord portion in which an urging force is generated between the metal elements, the surface pressure on the element body portions which contact with each other over a narrow area is higher than that on the element head portions which contact with each other over a wide area. For this reason, the element body portion is largely distorted, as compared with the element head portion, whereby the sectional shape of the metal element is deformed into a wedge shape. As a result, the plurality of metal elements are curved radially outwards and connected together in the chord portion of the metal belt and hence, the inner peripheral surfaces of the ring slots of the metal elements are urged radially inwards by the metal ring assemblies, whereby the rolling of the metal elements is prevented.

Moreover, because the contact surface of the element head portion which is a main contact surface is formed on the element head portion having a relatively simple flat plate shape rather than on the element body portion having a relatively complicated three-dimensional shape, it is convenient for the machining thereof.

Here, the term "lateral" is defined as a direction perpendicular to the rotating plane of the pulley, and the terms "radially inner side" and "radially outer side" are defined as being with respect to the rotating axis of the pulley.

In addition to the above arrangement, there is provided a belt for a continuously variable transmission, wherein the adjacent ones of the metal elements are located relative to each other by fitting of a projection and a recess, formed on one and the other of front and rear surfaces thereof, with each other.

With the above arrangement, when the metal elements have been moved to a position near the driven pulley in the chord portion of the metal belt extending from the drive pulley to the driven pulley, the adjacent ones of the metal elements are located relative to each other by fitting of the projection and the recess with each other. Therefore, succeeding metal elements can be slid laterally and arranged relative to the metal elements which have been wound around the driven pulley and constrained laterally, whereby the misalignment between the drive pulley and the driven pulley can be reliably absorbed.

Here, the front surface and rear surface of the metal element are defined as front and rear surfaces of the metal element in the direction of movement thereof.

BRIEF DESCRIPTION OF THE DRAWINGS

FIGS. 1 to 10 show a first embodiment of the present invention, wherein FIG. 1 is a skeleton illustration of a power transmitting system of a vehicle having a belt-type continuously variable transmission mounted thereon;

FIG. 2 is a partial perspective view of a metal belt;

FIG. 3 is a view taken in the direction or an arrow 3 in FIG. 2;

FIG. 4 is a view taken in the direction of an arrow 4 in FIG. 2;

FIG. 5 is a sectional view taken along a line 5—5 in FIG. 4;

FIG. 6 is a sectional view taken along a line 6—6 in FIG. 4;

FIG. 7 is a sectional view taken along a line 7—7 in FIG. 4;

FIG. 8 is a view for explaining the operation for the absorption of a misalignment;

FIG. 9 is a view for explaining the operation for deforming a main surface into a wedge shape; and FIG. 10 is a view showing metal elements in a chord portion in abutment states.

FIGS. 11 and 12 show a second embodiment of the present invention, wherein FIG. 11 is a sectional view of the metal element, similar to FIG. 5, and FIG. 12 is a sectional view of the metal element, likewise similar to FIG. 6.

BEST MODE FOR CARRYING OUT THE INVENTION

The mode for carrying out the present invention will now be described by way of embodiments of the present invention shown in the accompanying drawings.

Figure 1:
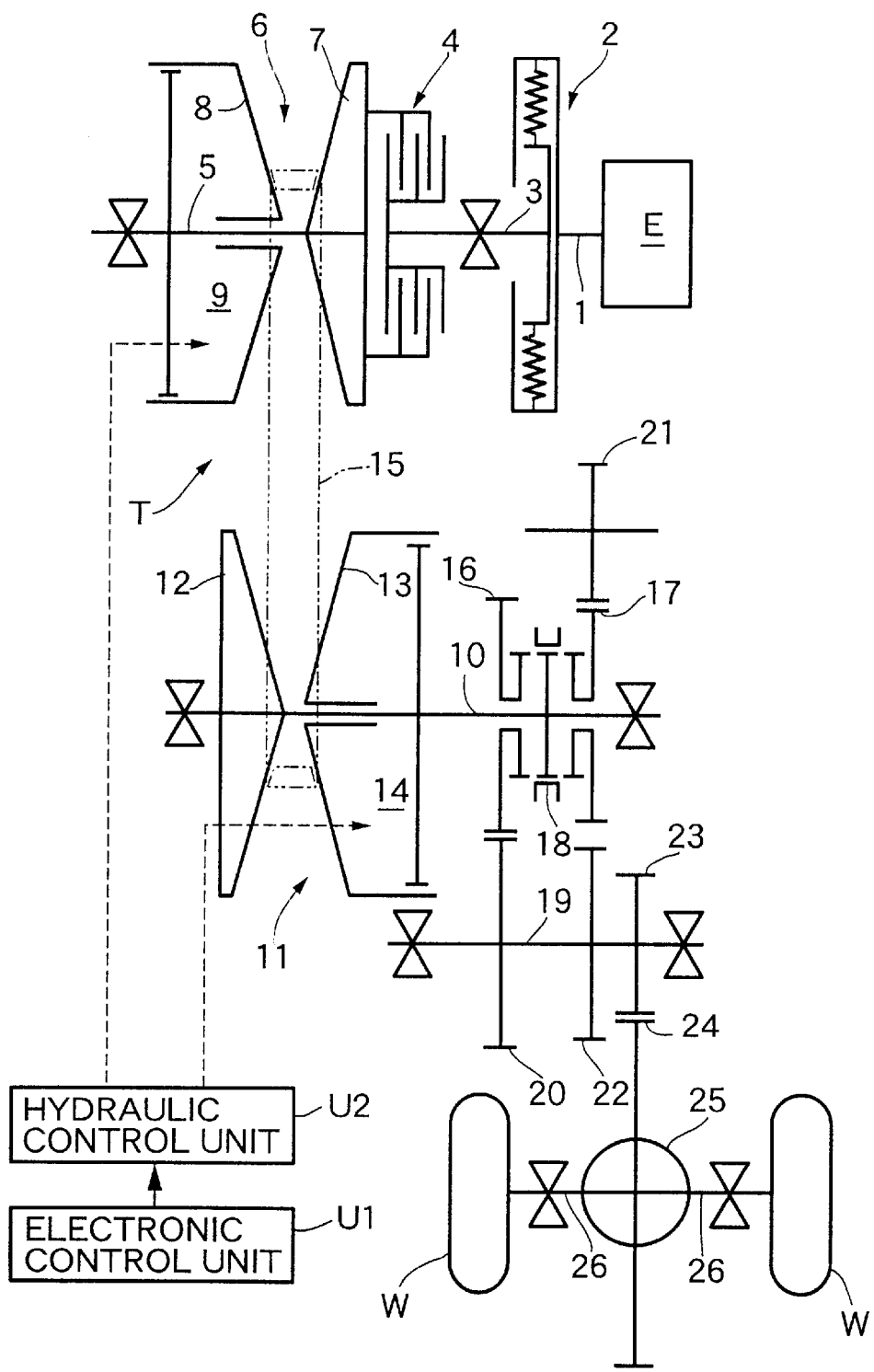

FIG. 1 shows the skeleton structure of a metal belt-type continuously variable transmission T mounted on an automobile. An input shaft 3 is connected to a crankshaft 1 of an engine E through a damper 2 and also connected to a drive shaft 5 of the metal belt-type continuously variable transmission T through a starting clutch 4. A drive pulley 6 is mounted on the drive shaft 5 and includes a stationary pulley half 7 secured to the drive shaft 5, and a movable pulley half 8 which is movable toward and away from the stationary pulley half 7. The movable pulley half 8 is biased toward the stationary pulley half 7 by a hydraulic pressure applied to an oil chamber 9.

A driven pulley 11 is mounted on a driven shaft 10 disposed in parallel to the drive shaft 5, and includes a stationary pulley half 12 secured to the driven shaft 10, and a movable pulley half 13 which is movable toward and away from the stationary pulley half 12. The movable pulley half 13 is biased toward the stationary pulley half 12 by a hydraulic pressure applied to an oil chamber 14. A metal belt 15 comprising a large number of metal elements 32 supported on a pair of left and right metal ring assemblies 31, 31 is wound around the drive pulley 6 and the driven pulley 11 (see FIG. 2). Each of the metal ring assemblies 31 comprises twelve metal rings 33 laminated one on another.

A forward drive gear 16 and a backward drive gear 17 are rotatably carried on the driven shaft 10 and are capable of being selectively coupled to the driven shaft 10 by a selector 18. Secured to an output shaft 19 disposed in parallel to the driven shaft 10 are a forward driven gear 20 meshed with the forward drive gear 16, and a backward driven gear 22 meshed with the backward drive gear 17 through a backward idle gear 21.

The rotation of the output shaft 19 is inputted to a differential 25 through a final drive gear 23 and a final driven gear 24 and then transmitted from the differential 25 through left and right axles 26, 26 to driven wheels W. W.

A driving force from the engine E is transmitted through the crankshaft 1, the damper 2, the input shaft 3, the starting clutch 4, the drive shaft 5, the drive pulley 6, the metal belt 15 and the driven pulley 11 to the driven shaft 10. When a forward travel range is selected, the driving force of the driven shaft 10 is transmitted through the forward drive gear 16 and the forward driven gear 20 to the output shaft 19 to move the vehicle forwards. When a backward travel range is selected, the driving force of the driven shaft 10 is transmitted through the backward drive gear 17, the backward idle gear 21 and the backward driven gear 22 to the output shaft 19 to move the vehicle backwards.

During this time, the shift ratio is continuously regulated by controlling the hydraulic pressures applied to the oil chamber 9 in the drive pulley 6 and the oil chamber 14 in the driven pulley 11 of the metal belt-type continuously variable transmission T by a hydraulic control unit $U_2$ which is operated by a command from an electronic control unit $U_1$. More specifically, if the hydraulic pressure applied to the oil chamber 14 in the driven pulley 11 is increased relative to the hydraulic pressure applied to the oil chamber 9 in the drive pulley 6, a groove width of the driven pulley 11 is decreased, leading to an increased effective radius. Attendant on this, a groove width of the drive pulley 6 is increased, leading to a decreased effective radius. Therefore, the shift ratio of the metal belt-type continuously variable transmission T is varied continuously toward "LOW". Reversely, if the hydraulic pressure applied to the oil chamber 9 in the drive pulley 6 is increased relative to the hydraulic pressure applied to the oil chamber 14 in the driven pulley 11, the groove width of the drive pulley 6 is decreased, leading to an increased effective radius. Attendant on this, the groove width of the driven pulley 11 is increased, leading to a decreased effective radius. Therefore, the shift ratio of the metal belt-type continuously variable transmission T is varied continuously toward "OD".

The structure of the metal element 32 will be described below. As used in this specification, the term "lateral direction" is defined as a direction perpendicular to a rotating plane of the drive pulley 6 or the driven pulley 11. The terms "radially inner side" and "radially outer side" are defined as being with respect to the rotating axis of the drive pulley 6 or the driven pulley 11, and the term "longitudinal direction" is defined as being the direction of movement of the metal elements 32 (see FIG. 2).

Figure 2:
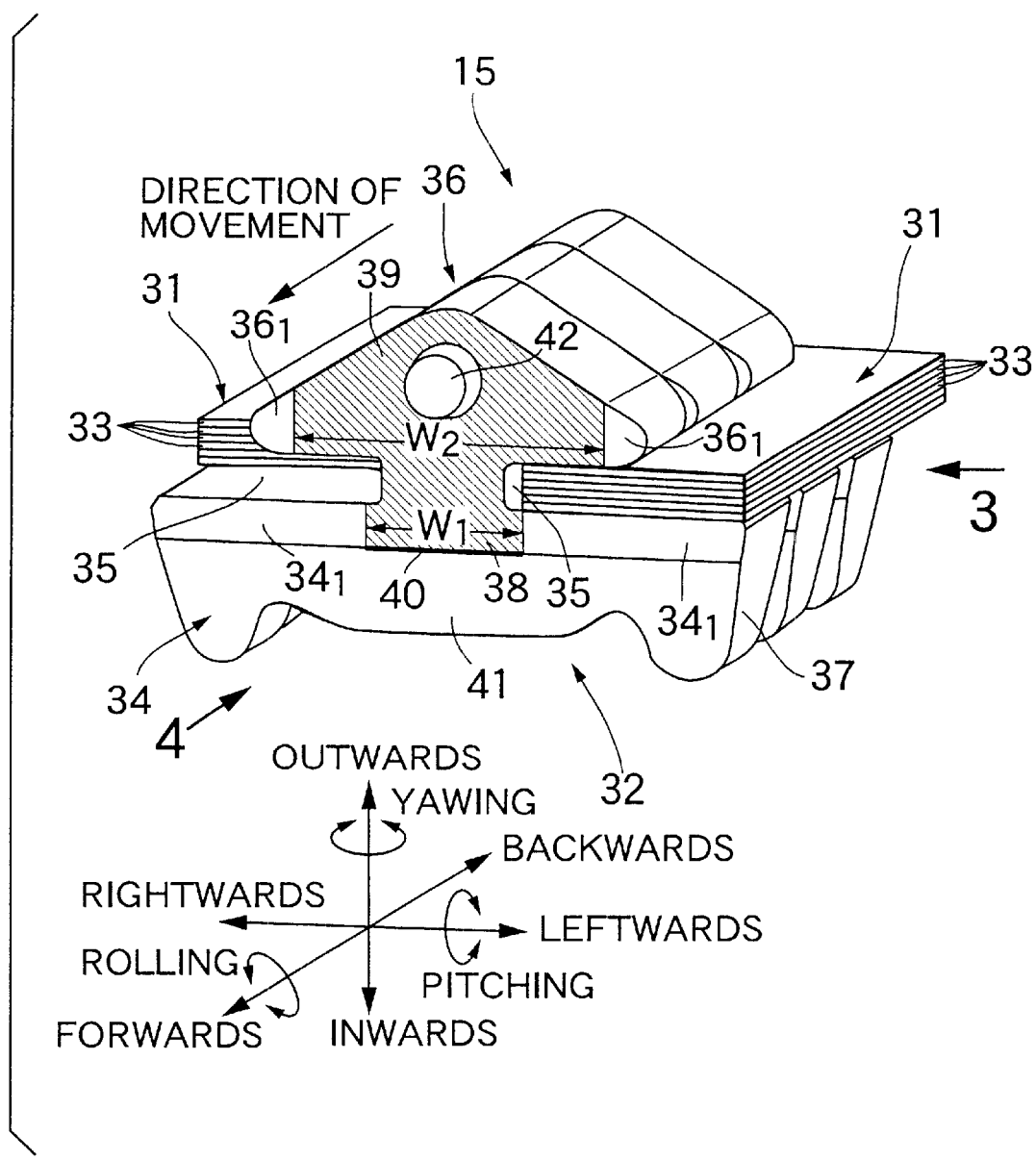
Figure 3:
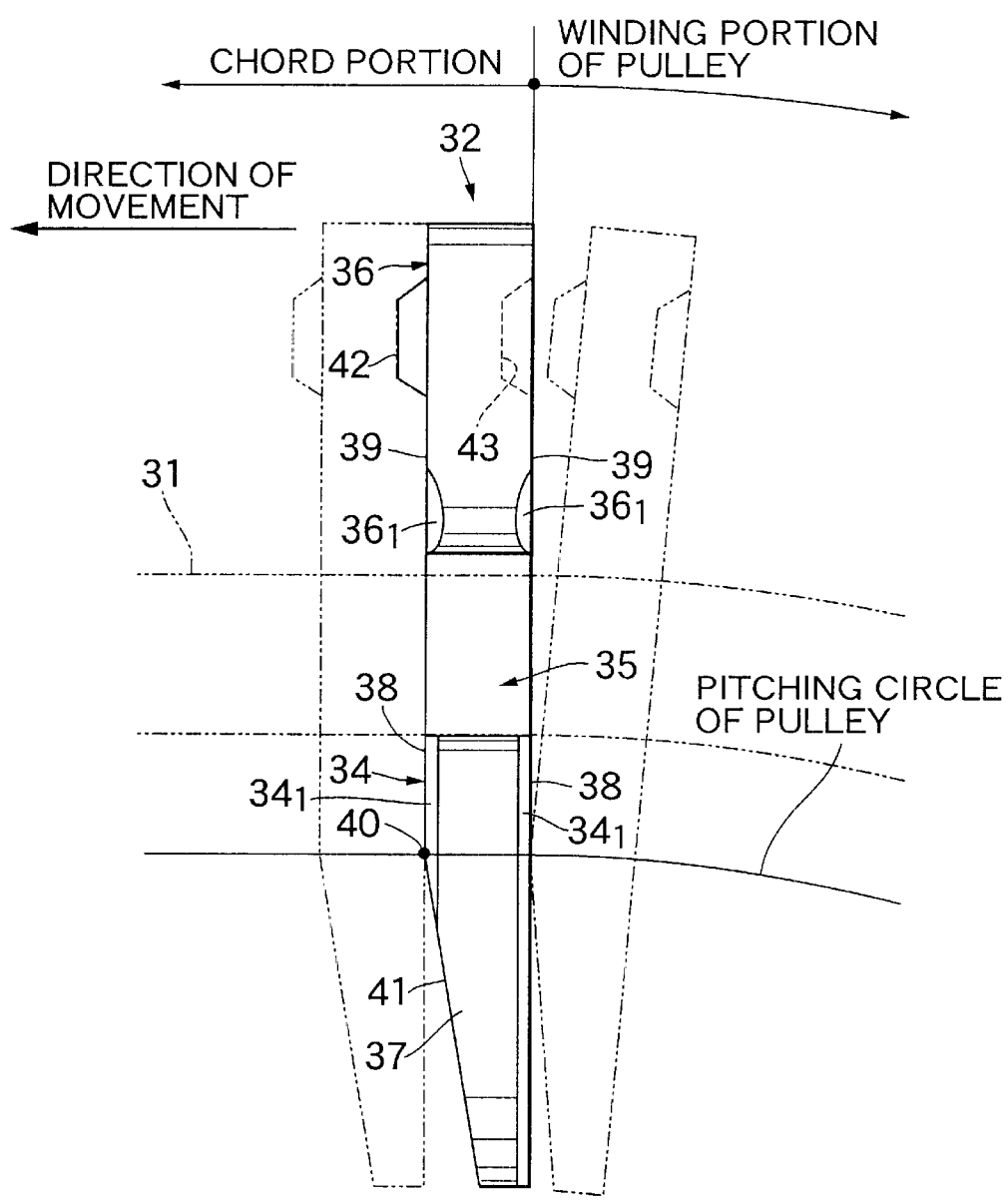

As shown in FIGS. 2 and 3, the metal element 32 formed from a metal plate by punching includes a substantially trapezoidal element body portion 34, and a substantially triangular element head portion 36 connected to the element body portion 34 through a pair of left and right ring slots 35, 35 into which the metal ring assemblies 31, 31 are fitted. A pair of pulley contact surfaces 37, 37 are formed on left and right opposite side edges of the element body portion 34 and are capable of being brought into contact with V-faces of the drive pulley 6 and the driven pulley 11. Inner contact surfaces 38, 38 and outer contact surfaces 39, 39 are formed respectively on front and rear surfaces of the metal element 32 on radially inner and outer sides with the ring slots 35, 35 interposed therebetween. The inner contact surface 38 and the outer contact surface 39 on the front surface of the metal element 32 are shown by drawing oblique lines in FIGS. 2 and 4. The shapes of the inner contact surface 38 and the outer contact surface 39 on the rear surface of the metal element 32 are the same as those on the front surface of the metal element 32. Thus, the inner contact surface 38 A and the outer contact surface 39 on the rear surface of the preceding metal element 32 can be brought into contact with the inner contact surface 38 and the outer contact surface 39 on the front surface of the succeeding metal element 32, respectively.

Further, a slope 41 is formed at a lower portion of the front surface of the element body portion 34 with a laterally extending rocking edge 40 interposed therebetween. A truncated projection 42 and a truncated recess 43 are formed on front and rear surfaces of the element head portion 36, respectively. The metal elements 32 are positioned relative to each other by fitting of the projection 42 provided on the front surface of the succeeding metal element 32 into the recess 43 provided on the rear surface of the preceding metal element 32. A small play is provided between the projection 42 and the recess 43 which are fitted with each other.

As can be seen by reference to FIGS. 4 to 7 in combination, tapered portions $34_1$ are formed at left and right opposite ends of the front and rear surfaces of the element body portion 34 and hence, the lateral width $W_1$ of each of the inner contact surfaces 38, 38 of the metal element 32 is defined by the tapered portions $34_1$. The radially inner end of each of the inner contact surfaces 38, 38 terminates in the rocking edge 40, and the radially outer end of the inner contact surface 38 terminates at a location short of the ring slots 35, 35. The rear surface of the element body portion 34 is not provided with the rocking edge 40 and the slope 41 and for this reason, the region of such rear surface excluding the tapered portions $34_1$, $34_1$ is on the same plane (see FIG. 3). However, the inner contact surfaces 38, 38 and the outer contact surfaces 39, 39 are defined as surfaces on which adjacent ones of the metal elements 32 contact with each other and hence, the inner contact surface 38 on the rear surface is of the same shape as the inner contact surfaces 38 on the front surface.

Tapered portions $36_1$ are formed at left and right opposite ends of the front and rear surfaces of the element head portions 36 and hence, the lateral width $W_2$ of each of the outer contact surfaces 39, 39 on the front and rear surfaces of the metal element 32 is define[0084] by the tapered portions $36_1$. The radially inner end of each of the outer contact surfaces 39, 39 and the radially outer end of each of the inner contact surfaces 38, 38 are connected with each other between the ring slots 35, 35.

Figure 4:
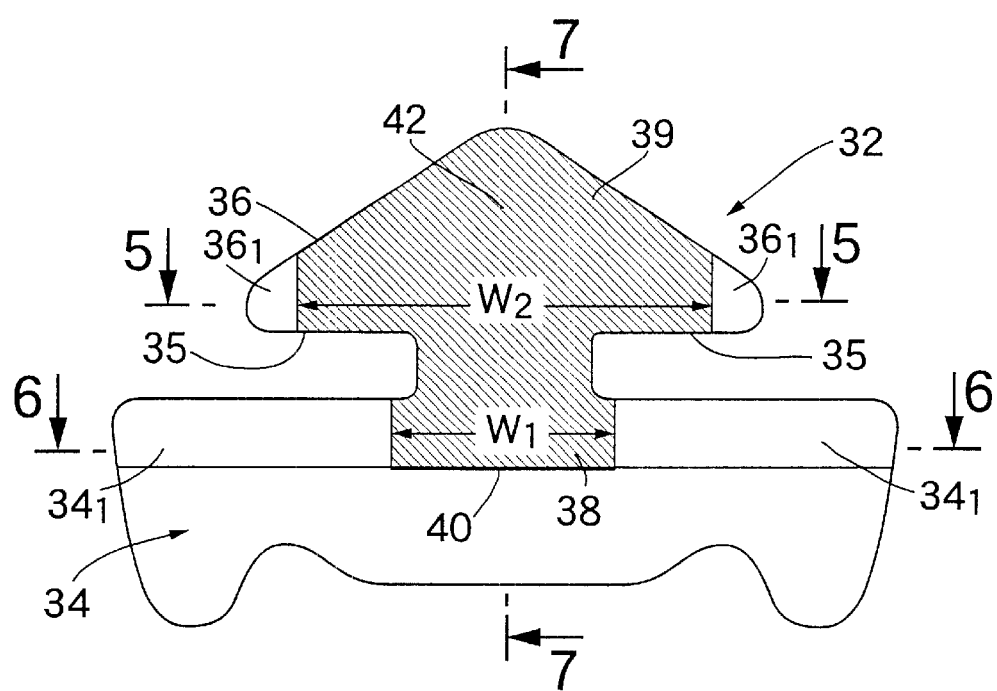

As can be seen from FIG. 4, the lateral width $W_1$ of each of the inner contact surfaces 38, 38 of the element body portion 34 is set smaller than the lateral width $W_2$ of each of the outer contact surfaces 39, 39 of the element head portion 36. Since the outer contact surfaces 39, 39 each of which is a main contact surface having the larger lateral width $W_2$ are formed on the relatively simple flat plate-shaped element head portion 36, the machining of the contact surfaces 39, 39 is easy, as compared with a case where the contact surfaces 39, 39 are formed on the complicated three-dimensionally shaped element body portion 34.

As shown in FIG. 3, the adjacent metal elements 32 lying in an advancing-side chord portion extending from the drive pulley 6 toward the driven pulley 11 (i.e., a chord portion capable of transmitting a driving force) transmit the driving force in a state in which the inner contact surfaces 38, 38 on the front and rear surfaces of the metal elements 32 are in contact with each other; the outer contact surfaces 39, 39 on the front and rear surfaces of the metal elements 32 are in contact with each other, and the projection 42 on the front surface of the succeeding metal element 32 has been fitted into the recess 43 on the rear surface of the preceding metal element 32.

Figure 8:
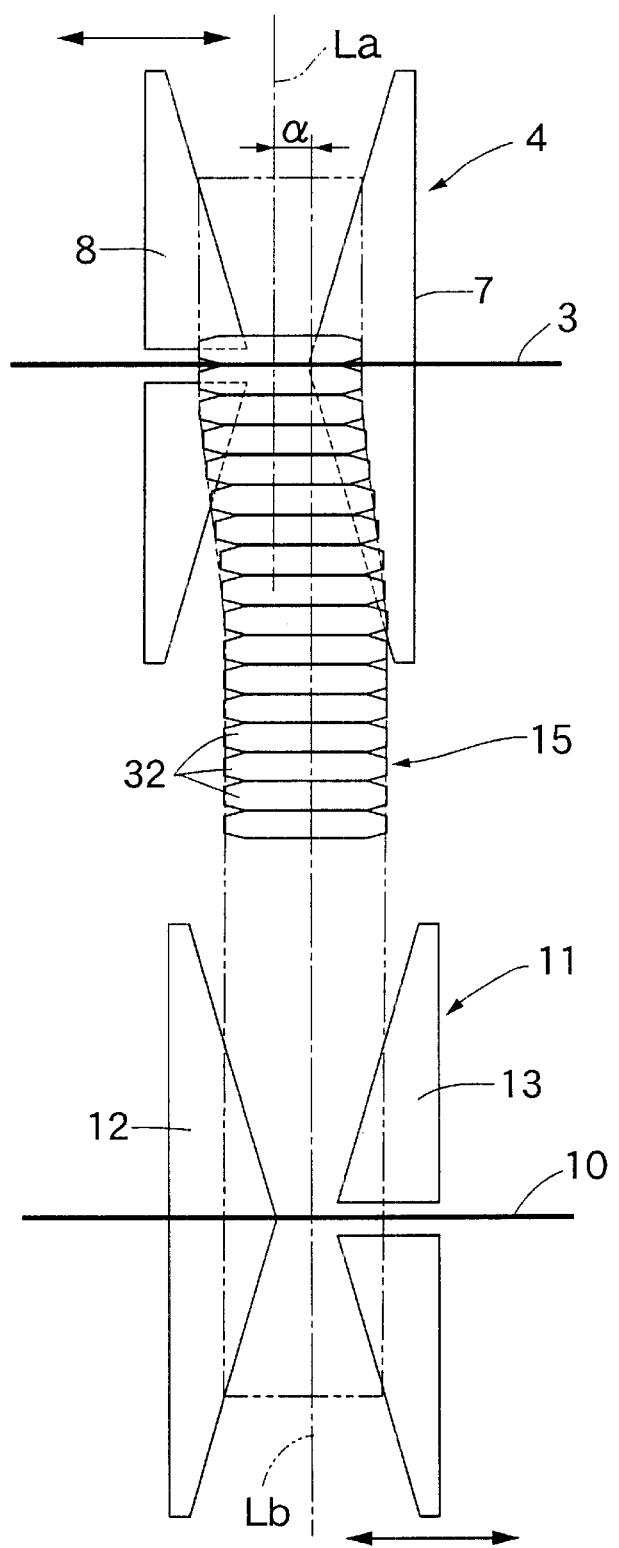

At this time, even if a misalignment a exists between the drive pulley 6 and the driven pulley 11, as shown in FIG. 8, the plurality of metal elements 32 existing in a region from the driven pulley 11 to near the drive pulley 6 can transmit the power in a parallel and longitudinally-arranged state without yawing. Namely, since the lateral width $W_2$ of each of the outer contact surfaces 39, 39 of the adjacent metal elements 32 is set at a sufficiently large value, the yawing of the metal elements 32 is reliably prevented by the close contact of the outer contact surfaces 39, 39 with each other. In addition, the metal elements 32 already engaged with the driven pulley 11 are in states in which their lateral movements have been held down and hence, the metal elements 32 reaching near the driven pulley 11 are moved laterally while being slid on the inner contact surfaces 38, 38 and the outer contact surfaces 39, 39, so that they are arranged just behind the metal elements 32 whose lateral movements have already been held down. This lateral thrust is transmitted in sequence from the metal element 32 held down on the driven pulley 11 to the succeeding metal element 32 through the projection 42 and the recess 43 fitted with each other.

The metal elements 32 wound around the drive pulley 6 and the driven pulley 11 are pitched relative to each other around the rocking edge 40 and arranged radiately radially of the pulleys 6 and 11. In this state, the outer contact surfaces 39, 39 remain spaced apart from each other, and the inner contact surfaces 38, 38 are in contact with each other at radially inner edges thereof, i.e., at the rocking edge 40. At this time, the metal elements 32 can yaw relatively easily, because the lateral width $W_1$ (namely, the length of the rocking edge 40) of each of the inner contact surfaces 38, 38 is set at a small value. Therefore, even when the metal elements 32 are meshed with the drive pulley 6 or the driven pulley 11 in a state in which they have been inclined in a yawing direction, the metal elements 32 are corrected into a correct attitude by the yawing of the pulley contact surfaces 37, 37 by a reaction force received from the V-faces in the pulleys 6 and 11. Thus, it is possible to avoid the generation of an abnormal wearing in the zone of contact between the drive pulley 6 or the driven pulley 11 and the metal elements 32, thereby enhancing the durability.

Figure 9:
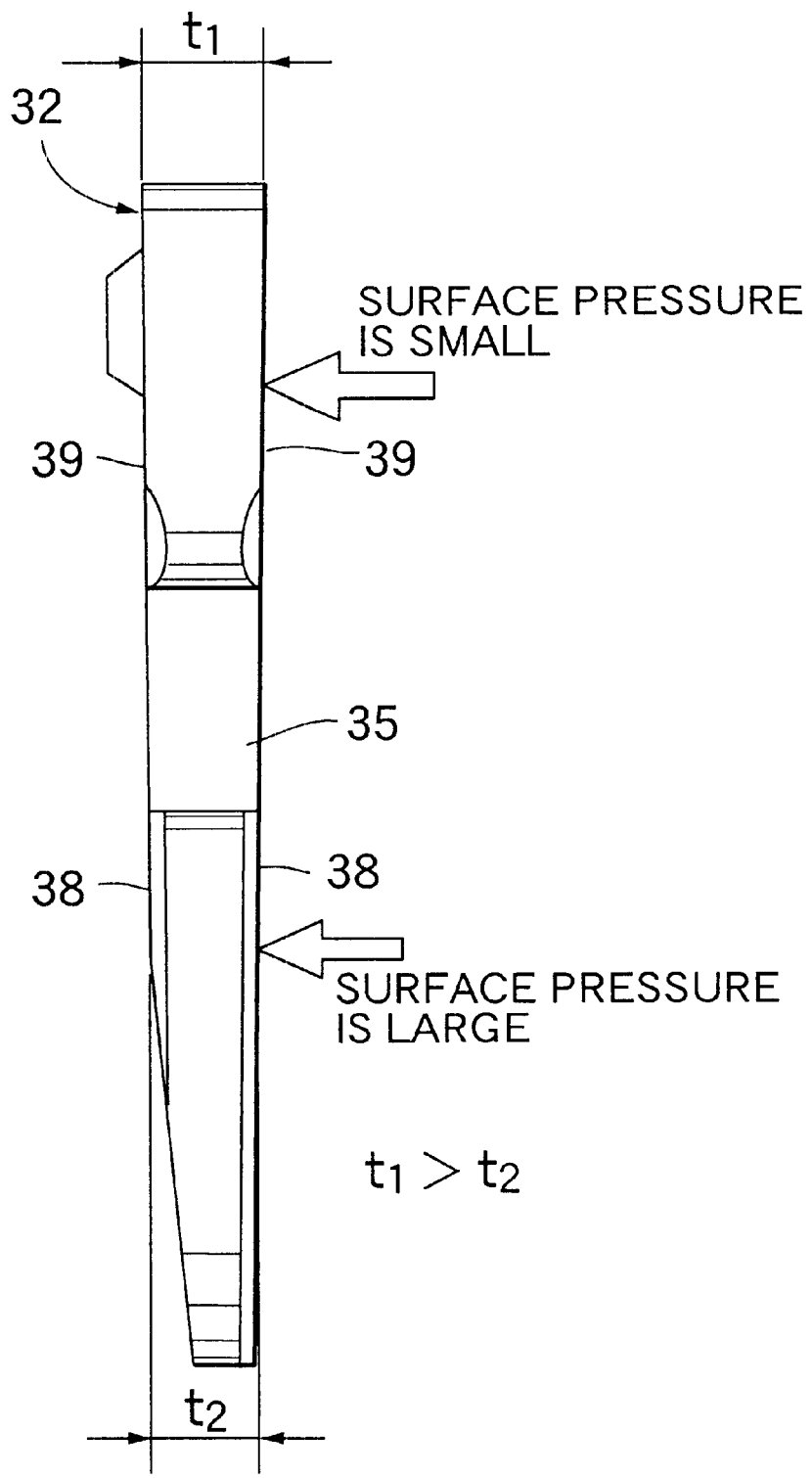
Figure 10:
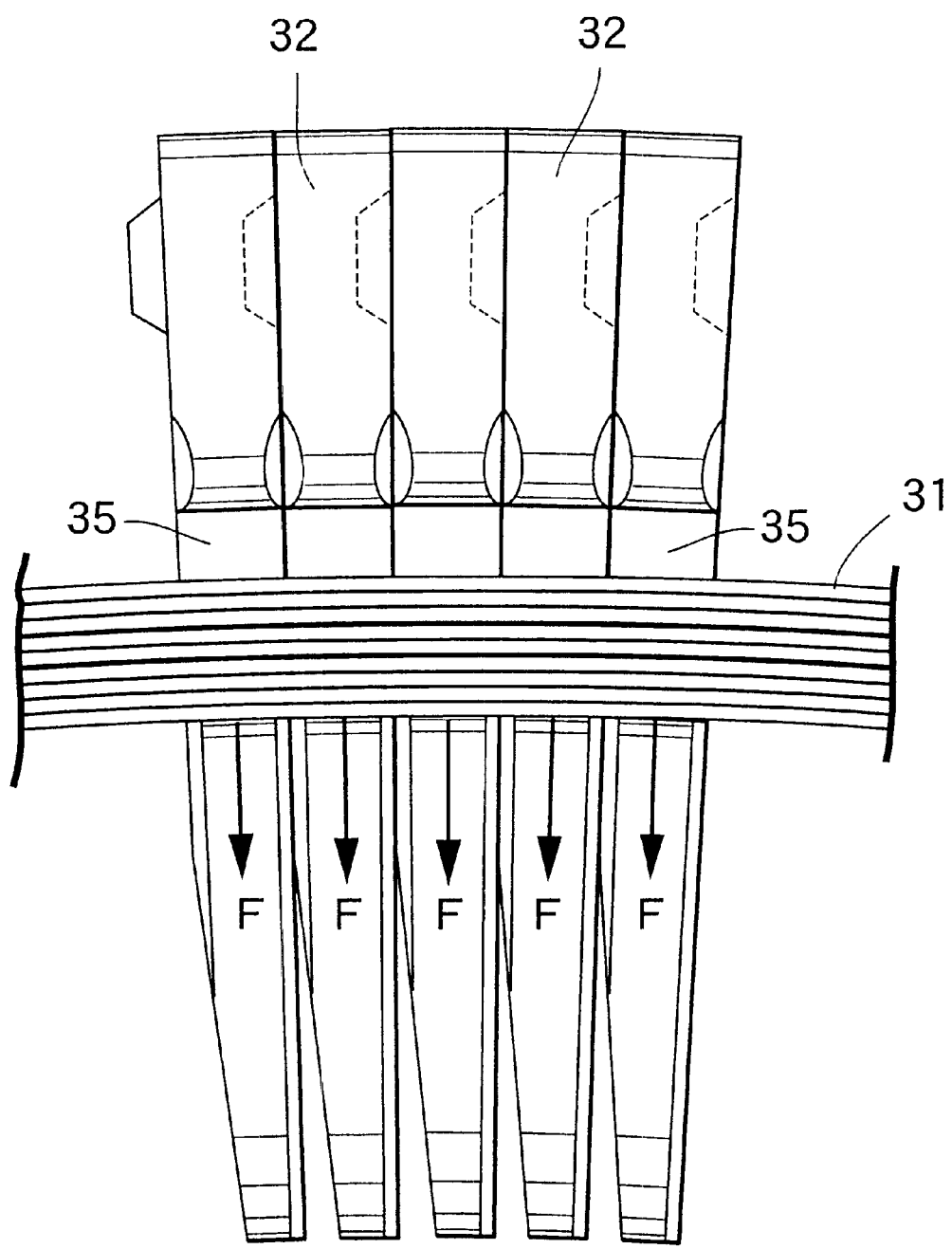

As can be seen from FIGS. 9 and 10, the surface pressure acting on the inner contact surfaces 38, 38 having a small area is larger, as compared with the surface pressure acting on the outer contact surfaces 39, 39 having a large area. For this reason, the thickness $t_2$ of the radially inner portion of the metal element 32 is smaller than the thickness $t_1$ of the radially outer portion of the metal element 32 due to the compression and deformation caused by the surface pressure, and the section of the metal element 32 is of a tapered shape as exaggeratively shown in FIG. 9. Therefore, when the metal elements 32 are connected in close contact with one another in the chord portion, each of the metal elements 32 is curved radially outwards into an arcuate shape due to the tapered shape as shown in FIG. 10. As a result, radially inward loads F, F from the left and right metal ring assemblies 31, 31 are applied to inner circumferential surfaces of the left and right ring slots 35, 35 of the metal elements 32, and the rolling of the metal elements 32 can be prevented by the loads F, F.

Further, the lateral width $W_1$ of each of the inner contact surfaces 38, 38 of the element body portion 34 exerts an influence on a hertz stress of the rocking edge 40 generated by the urging force between the metal elements 32 which abut against each other. For the mass-produced metal belt 15, from the request that a belt stress at the time of transmitting the maximum horsepower (in the highest speed operational state) should be equal to or less than a critical stress of the material, it is desirable to set the lateral width $W_1$ of each of the inner contact surfaces 38, 38 larger than the values shown in Table 1.

TABLE 1

| R (mm) | 6.0 | 8.0 | 10.0 | 12.0 | 14.0 | 16.0 |
|---|---|---|---|---|---|---|
| $W_1$ (mm) | 18.0 | 13.7 | 11.0 | 9.2 | 7.9 | 6.9 |

Table 1 shows the minimum value of the lateral width $W_1$ of each of the inner contact surfaces 38, 38 of the element body portion 34 which is capable of maintaining the maximum hertz stress at 120 kgf/mm$^2$ or less when the metal belt 15, having the metal elements 32 in which the width of the rocking edge 40 is set at 24 mm, is operated in the maximum horsepower transmitting state (with an input torqu[0085] of 14.3 kgf-m, an input rotational speed of 6000 rpm, a speed ratio of 0.61, a thrust safety ratio of 1.3, an urging force between the elements of 427.0 kgf) while varying the radius R of the rocking edge 40. As is apparent from Table 1, since the maximum hertz stress increases as the radius R of the rocking edge 40 becomes smaller, the minimum value of the lateral width $W_1$ of each of the inner contact surfaces 38, 38 of the element body portion 34 increases. For example, in the metal belt in which the radius R of the rocking edge 40 is set at 10.0 mm, it is desirable to set the lateral width $W_1$ of each of the inner contact surfaces 38, 38 at 11.0 mm or more.

Figure 11:
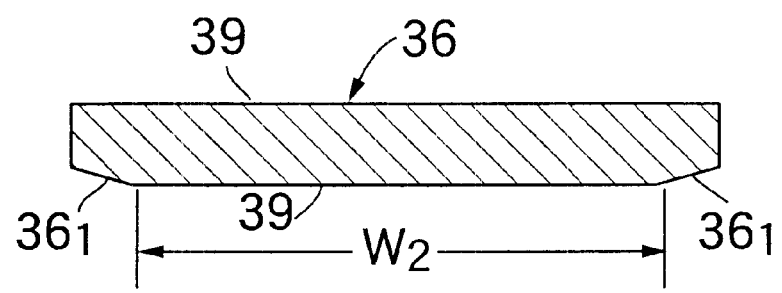
Figure 12:
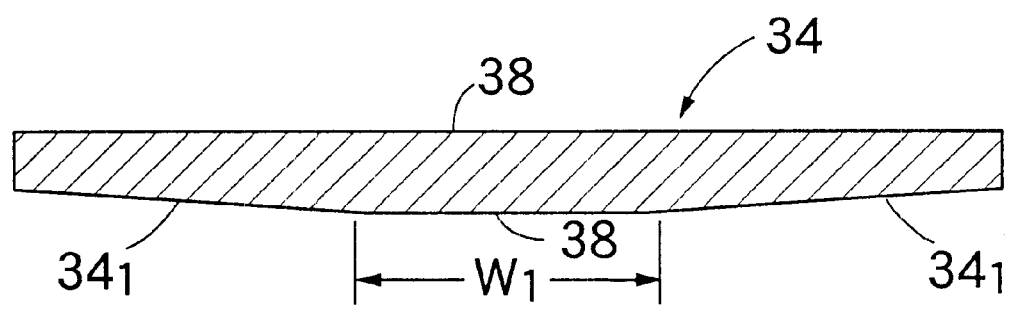

A second embodiment of the present invention will now be described with reference to FIGS. 11 and 12.

Figure 5:
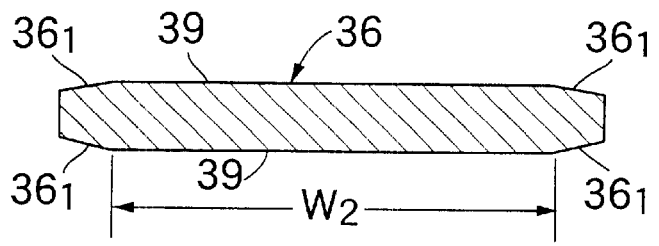
Figure 6:
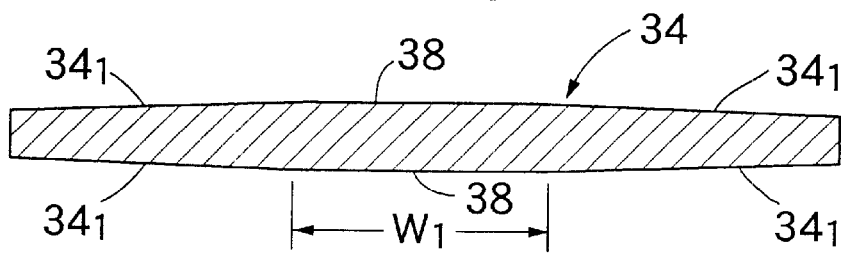
Figure 7:
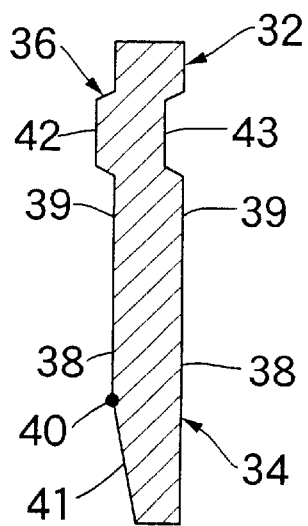

In the first embodiment shown in FIGS. 5 and 6, the tapered portions $34_1$ and $36_1$ have been formed on the front and rear opposite surfaces of the metal element 32, but in the second embodiment, the tapered portions $34_1$ and $36_1$ are formed in only one (a front surface) of surfaces of the metal element 32. In both the embodiments, the shapes of the front surfaces of the metal elements 32 are the same as each other and hence, the shapes of the inner contact surfaces 38, 38 and the outer contact surfaces 39, 39 are also substantially the same as each other. According to the second embodiment, the function and effects similar to that in the first embodiment can be obtained, while further simplifying the shape of the metal element 32.

Further according to the second embodiment, even if the width of the rocking edge 40 and the radius R of the rocking edge 40 are the same as those in the first embodiment, the hertz stress can be set at a lower value than that in the first embodiment, leading to an advantage in view of the durability.

Although the embodiments of the present invention have been described in detail, it will be understood that the present invention is not limited to the above-described embodiments, and various modifications in design may be made without departing from the subject matter of the invention.

The important factors of the shapes of the inner contact surfaces 38, 38 and the outer contact surfaces 39, 39 are the lateral widths $W_1$ and $W_2$, and the other factors may be properly changed. For example, the radial height of each of the inner contact surfaces 38, 38 and the outer contact surfaces 39, 39 may be set at any value and, the positional relationship between the projection 42 and the recess 43 may be reversed. I[008e] addition, the inner contact surfaces 38, 38 and the outer contact surfaces 39, 39 have been formed continuously with each other in the embodiments, but may be separated from each other at a location between the left and right ring slots 35, 35. In short, it is important that the lateral width $W_2$ of the outer contact surfaces 39, 39 which are in contact with each other when the metal element 32 is in the chord portion, is set at a large value to inhibit the yawing of the metal element 32, and the lateral width $W_1$ of the inner contact surfaces 38, 38 which are in contact with each other when the metal element 32 is at a location where it has been wound around the pulley, is set at a small value to permit the yawing of the metal element 32. Considering the hertz stress of the rocking edge 40 during the operation, however, it is more advantageous to set the lateral width $W_1$ of the inner contact surfaces 38, 38 at a large value (see Table 1).

Considering the various factors described above together, it is desirable to set the ratio $W_1/W_2$ in a range of $0.3<W_1/W_2<0.7$, which is the ratio between the lateral width $W_1$ of each of the inner contact surfaces 38, 38 of the element body portion 34 and the lateral width $W_2$ of each of the outer contact surfaces 39, 39.

TABLE 2

| Input torque (kgf-m) | 8 | 9 | 10 | 11 | 12 | 13 | 14 | 15 | 16 | 17 | 18 | 19 | 20 |
|---|---|---|---|---|---|---|---|---|---|---|---|---|---|
| Urging force (kgf) | 273.2 | 298.0 | 322.9 | 347.7 | 372.5 | 397.4 | 422.2 | 447.0 | 471.9 | 496.7 | 521.6 | 546.4 | 571.2 |
| $W_1$ (mm) | 6.9 | 7.7 | 8.3 | 9.0 | 9.6 | 10.2 | 10.9 | 11.5 | 12.2 | 12.8 | 13.4 | 14.1 | 14.7 |
| $W_1/W_2$ | 0.345 | 0.385 | 0.415 | 0.450 | 0.480 | 0.510 | 0.545 | 0.575 | 0.610 | 0.640 | 0.670 | 0.705 | 0.735 |

Figure 13:
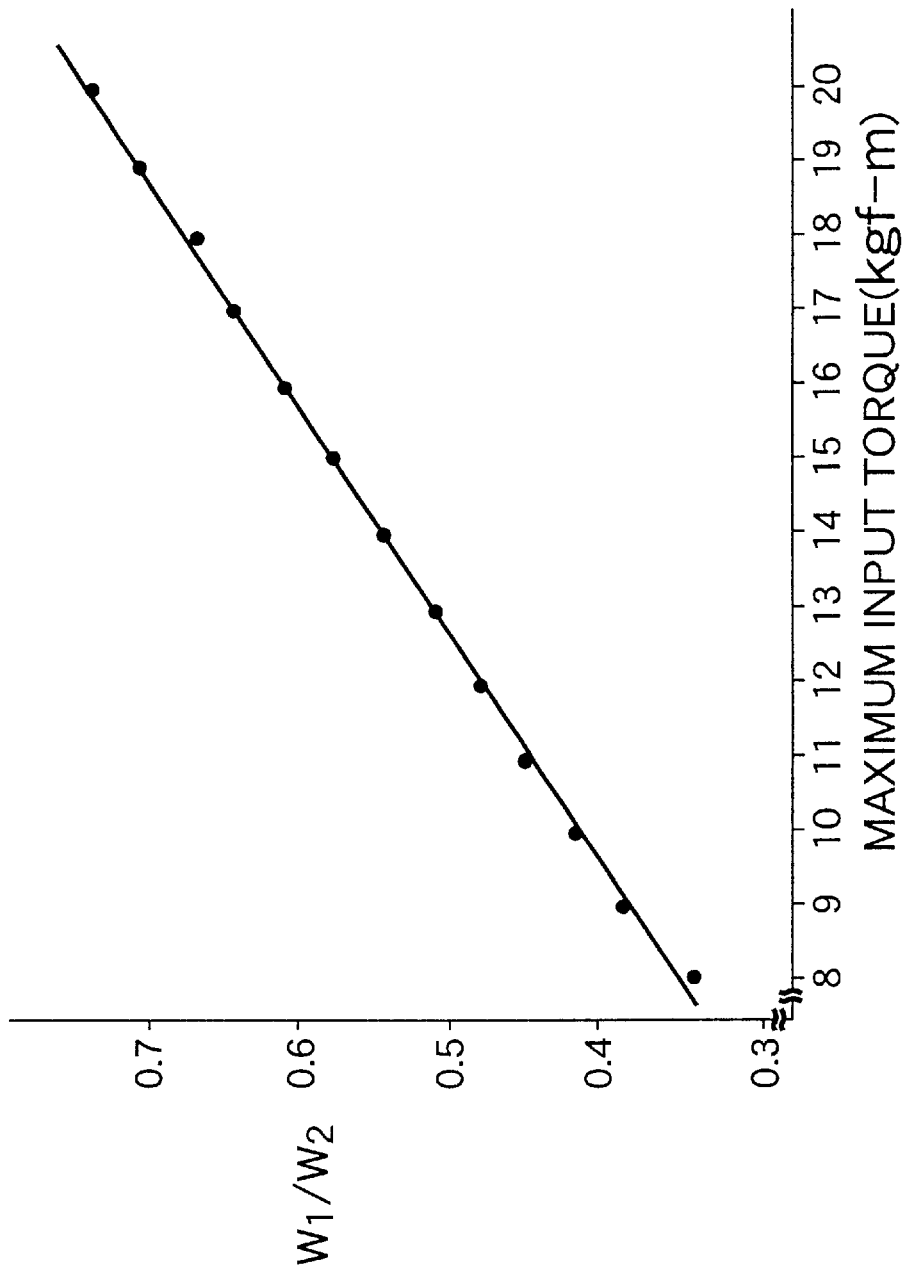
FIG. 13 is a graph showing a limit value of $W_1/W_2$ when the maximum input torque is varied.
Figure 14:
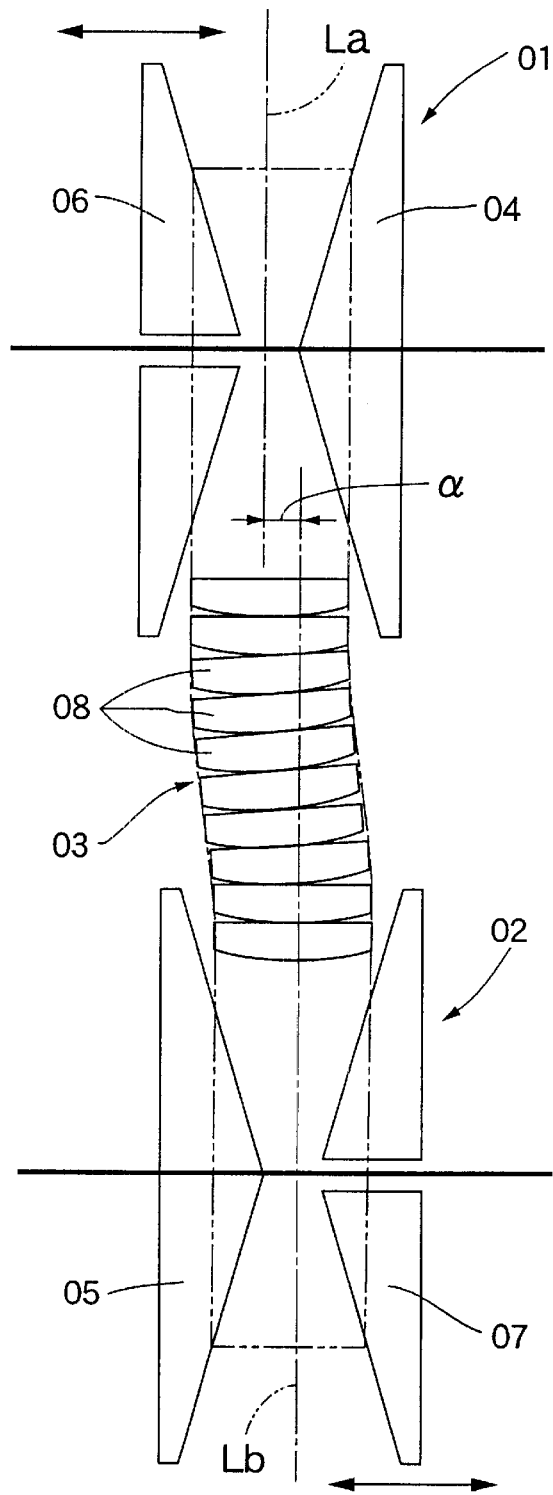
FIG. 14 is a view showing a conventional continuously variable transmission.

Table 2 and FIG. 13 show the value of the ratio $W_1/W_2$ which is capable of maintaining the maximum hertz stress at 120 kgf/mm$^2$ or less when the metal belt 15 is operated in the maximum horsepower transmitting state (with an input rotational speed of 6000 rpm, a speed ratio of 0.61, a thrust safety ratio of 1.3) while varying the value of the input torque, wherein the metal belt 15 includes the metal elements 32 in which the lateral width $W_2$ of the outer contact surfaces 39, 39 of the element body portion 34 is set at 20 mm and the radius R of the rocking edge 40 is set at 10 mm.

The urging force between the elements is increased as the input torque is increased, and with this, the necessary lateral width $W_1$ of the inner contact surfaces 38, 38 of the element body portion 34 is increased and hence, the ratio $W_1/W_2$ is also increased. Therefore, in order to ensure the durability of the metal element in a range of 8 kgf-m to 18 kgf-m which is a practical input torque, it is desirable to set the value of the ratio $W_1/W_2$ in a range of $0.3 < W_1/W_2 < 0.7$ making allowance for the safety ratio.

What is claimed is:

1. A belt for a continuously variable transmission, comprising a large number of metal elements supported on metal ring assemblies each of which is comprised of a plurality of endless metal rings laminated one on another, said belt being wound around a drive pulley and a driven pulley to transmit a driving force between both of said pulleys, wherein each of said metal elements includes ring slots into which the metal ring assemblies are fitted, an element body portion located on a radially inner side of said ring slots, and an element head portion located on a radially outer side of said ring slots, said element body portion and said element head portion being formed with contact surfaces, continuously, at which adjacent ones of the metal elements can contact with each other, the contact surface of the element body portion extending laterally centrally on the element body portion and has a lateral width which is smaller than an entire lateral width of the element body portion and smaller than a lateral width of the contact surface of the element head portion.

2. A belt for a continuously variable transmission according to claim 1, wherein said adjacent ones of the metal elements are located relative to each other by fitting of a projection and a recess, formed on one and the other of front and rear surfaces thereof, with each other.

3. A belt for a continuously variable transmission according to claim 1, wherein tapered portions are formed at opposite ends of the front and rear surfaces of said element head portions defining the lateral width of the contact surface of the element head portion.

4. A belt for a continuously variable transmission according to claim 2, wherein a small play is provided between said projection and said recess which are fitted with each other.

* * * * *

UNITED STATES PATENT AND TRADEMARK OFFICE
CERTIFICATE OF CORRECTION

PATENT NO.     : 6,440,025 B1
DATED          : August 27, 2002
INVENTOR(S)    : Ohnuki It is certified that error appears in the above-identified patent and that said Letters Patent is hereby corrected as shown below:

Title page,
Item [22], please change the PCT Filed dated from "September 8, 1999" to
-- March 8, 1999 --.

Signed and Sealed this

Twenty-ninth Day of July, 2003

JAMES E. ROGAN
*Director of the United States Patent and Trademark Office*